June 11, 1957 — R. E. BALLENTINE — 2,795,520
EXTRUDED PHOSPHORUS-SILVER-COPPER BRAZING ALLOYS
Filed Jan. 23, 1953
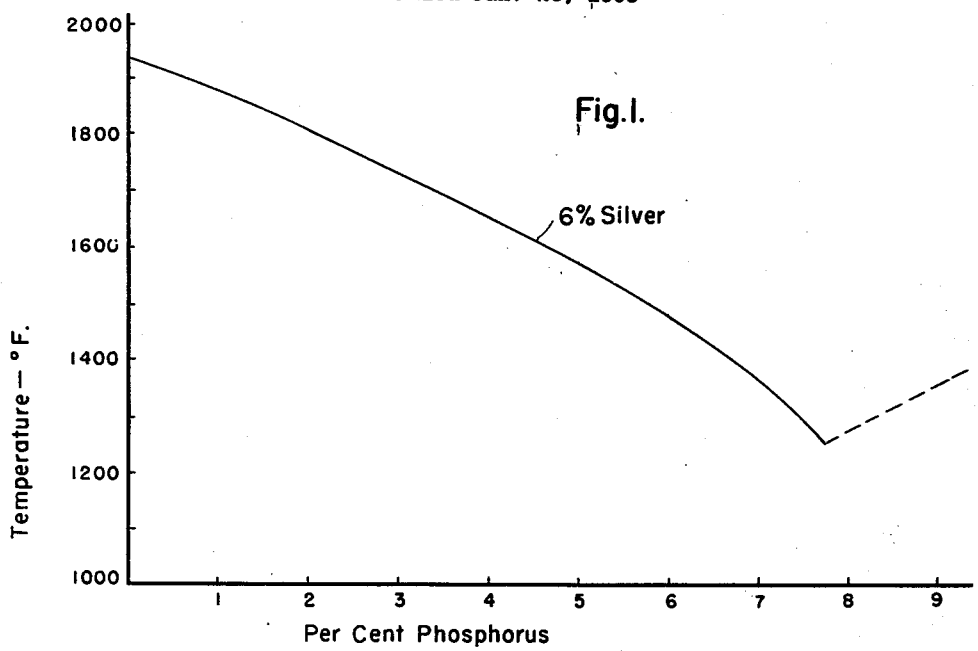
Fig.I.
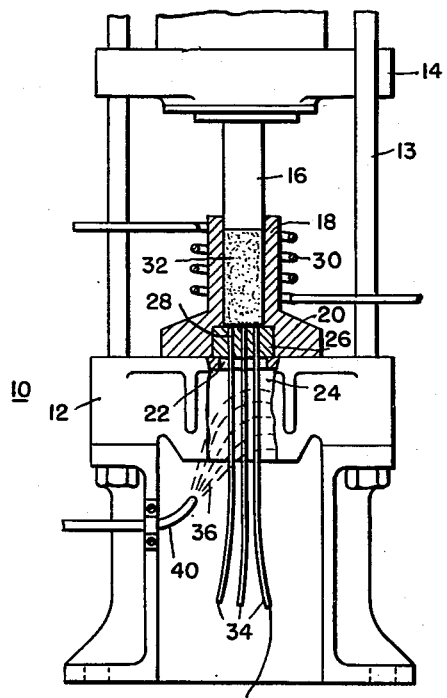
Fig.2.
WITNESSES:
E. A. M'Closkey.
Leon J. Vaza
Ductile wire comprising an alloy of from 6% to 9% silver, 7% to 8% phosphorus and the balance copper.
INVENTOR
Richard E. Ballentine.
BY Frederick Shapoe
ATTORNEY

United States Patent Office 2,795,520
Patented June 11, 1957

2,795,520

EXTRUDED PHOSPHORUS-SILVER-COPPER BRAZING ALLOYS

Richard E. Ballentine, Buffalo, N. Y., assignor to Westinghouse Electric Corporation, East Pittsburgh, Pa., a corporation of Pennsylvania Application January 23, 1953, Serial No. 332,985

1 Claim. (Cl. 148—32)

This invention relates to brazing alloys and in particular to ductile brazing alloy members produced by the extrusion of phosphorus-silver-copper.

While it has been suggested in the prior art to prepare alloys of phosphorus, silver and copper in the ranges of from 10% and more of silver, it has been stated that no useful ternary alloys may be secured if the silver is below 10%. Furthermore, in some cases phosphorus-copper brazing alloys have been modified by including small amounts of silver. However, such alloys have been limited to those containing only a few percent by weight of silver and not over 4½% silver at the most. Consequently, the art has held that ternary alloys containing more than 4½% and less than 10% of silver, the balance being phosphorus and copper, are not useful.

The object of this invention is to provide useful ductile members composed of an alloy of from 6% to 9% by weight of silver, from 7% to 8% by weight of phosphorus and the balance being copper.

Another object of the invention is to provide a process for extruding ductile wire and rod composed of an alloy of from 6% to 9% by weight of silver, from 7% to 8% phosphorus and the balance being copper.

Other objects of the invention will, in part, be ovbious, and will, in part, appear hereinafter. For a better understanding of the nature and objects of the invention, reference should be had to the following detailed description and drawing, in which:

Figure 1 is a graph plotting the melting temperature of a ternary alloy comprising 6% silver and various proportions of phosphorus, the balance being copper, and Fig. 2 is a view in elevation partly in section of a press for extruding the alloys of the present invention.

I have discovered that useful members may be prepared from a ternary alloy composed of 6% to 9% by weight of silver, from 7% to 8% by weight of phosphorus and the balance copper, except for incidental impurities, which will not exceed about 1%, by extruding the alloy within a narrow critical range of temperatures whereby there is produced ductile wire and rod having a low melting point and other desirable characteristics. This discovery is surprising in view of the extensive work in the brazing art for more than 20 years in which alloys of such composition have been stated to be unsatisfactory.

Referring to Fig. 1 of the drawing, there is plotted the liquidus curve for an alloy comprising 6% by weight of silver and varying proportions of phosphorus up to 9% by weight and the balance being substantially all copper. It will be noted that the lowest melting 6% silver composition has a melting point of about 1250° F. (approximately 667° C.). The liquidus curves for the ternary alloys containing up to 9% by weight silver are quite close and slightly below the 6% silver curve shown, being within about 20° F. of the 6% silver curve. The lowest melting temperature for silver-copper-phosphorus ternary alloys containing from 6% to 9% by weight of silver is approximately 10° F. lower than the eutetic point for the 6% silver-phosphorus-copper ternary alloy.

It is critical to prepare ductile rods or other members from the silver phosphorus copper alloys of the present invention if they are to have utility for most brazing operations. It has been discovered that these alloys are so difficult to fabricate into wire, rod or other members by hot rolling, drawing or other procedures that it is commercially impractical to use such fabricating procedures. I have discovered that if the silver-phosphorus-copper alloys of the present invention are extruded from ingots while at a temperature of from 475° C. to 600° C. that ductile rod, strip, or wire may be produced therefrom. Furthermore, these ductile extrusions may be easily shaped into rings and other members as may be found desirable for various brazing applications. If the alloy is extruded below 475° C., the resulting wire rod is brittle. If the temperature during extrusion is above 600° C., the constituents of the alloy may separate and wire or rod produced tends to pull apart or disintegrate into useless pieces.

Referring to Fig. 2 of the drawing, there is illustrated an extrusion press 10 in which alloys composed of 6% to 9% silver, from 7% to 8% phosphorus and the balance being copper can be extruded from ingots into ductile wire or rod. The press comprises a base 12 to which are attached tension columns 13 guiding and holding in place a press head 14 in which is mounted a suitable movable extrusion plunger 16. The plunger 16 may be actuated by hydraulic means contained within the head 14. The plunger 16 fits closely within a cylinder 18 of suitable tool steel. The cylinder 18 is supported by an enlarged portion 20 resting on the base 12. The cylinder 18 is centered over an opening 22 in the base 12 leading to an open area 24 within the base. There is disposed within the enlarged portion 20 a die 26 of material having a high strength at temperatures of the order of 650° C. Alloys suitable for this service are well known and need not be set forth herein. The die 26 comprises a plurality of apertures 28, ordinarily round, but which may be of any other suitable shape and size. Brazing rod or wire for most applications has a diameter or thickness of from 1/32" to 1/4". The cylinder 18 is surrounded by a heating coil 30 which preferably is a high-frequency heating coil to which electrical current at a frequency of 9,600 cycles, for example, is applied and this current will rapidly heat the cylinder and the contents thereof to any predetermined temperature.

There is disposed within the cylinder 18 an ingot 32 of an alloy of from 6% to 9% silver, from 7% to 8% phosphorus and the balance copper. This ingot may be prepared by melting a predetermined weight of copper and silver in an induction furnace, and then introducing the required amount of phosphorus, the melting being carried out in either a non-reactive atmosphere of nitrogen or other inert gas or even under vacuum. The melt may be then cast in molds, preferably water cooled, into a cylindrical shape fitting closely to the dimensions of the cylinder 18. It has been found that successive ingots introduced in the cylinder 18 weld together under the temperatures and pressures involved whereby wire may be continuously extruded from a plurality of ingots into any desired length. The ingots 32 are preferably preheated before being placed in the cylinder. The preheating temperature is from 475° C. to 600° C. or a few degrees higher. The induction heating coil 30 is controlled to maintain the temperature of the ingots within this range. When pressure is applied to the ingot 32 by the extruding plunger 16, wire or rods 34 are extruded through the openings 28 in the die 26. A spray 36 of water applied through a nozzle 40 is applied into the open area 24 in order to reduce promptly the temperature of the extruded wire 34 so that no appreciable amount of oxides are produced thereon. The extruded wire rod 34 is quite ductile and may be wound on reels or cut into suitable lengths for brazing rod or otherwise formed into members such as rings for specific applications of the brazing alloy.

The following examples are exemplary of the practice of this invention. In these examples all percentages are by weight.

*Example I*

There was prepared in a furnace a melt comprising 7.8% phosphorus, 6% silver and the balance copper. The liquidus temperature for the alloy was 1255° F., and the solidus temperature was 1190° F. Ingots of this alloy were extruded into wire of ⅝₄" diameter by heating the ingots to a temperature of approximately 575° C. and extruding them within a press such as shown in Fig. 2 of the drawing. The extruded wire was quite ductile and could be readily fabricated into various rings and other brazing shapes. The extruded wire was readily bent and handled to permit brazing of joints therewith. The joints made with the alloy were found to be strong enough to meet all requirements and were comparable to joints made with alloys having much higher percentages of silver therein; namely, 20% and more of silver.

*Example II*

An alloy was prepared by melting 7.5% of phosphorus, 9% silver and the balance being copper. The liquidus temperature of this alloy was 1270° F. and the solidus temperature 1190° F. Wire of the alloy of this example was extruded in the press of Fig. 2 into various diameter wire which was found to be quite ductile and could be employed for brazing either as a rod or in the shape of pre-formed rings and other members. Strong brazed joints were made by employing the extruded members in conventional brazing procedures.

The alloys of the present invention can be employed in making brazing joints in furnaces provided with protective atmospheres, particularly, furnaces provided with hydrogen or inert atmospheres. The brazing alloys of the present invention may be employed for electrical welding as well as carbon arc welding. The alloy may be used for various hard soldering operations employing torches provided with various gaseous heating media such as acetylene.

It will be observed that highly satisfactory brazing members have been produced in accordance with this invention.

Since certain changes may be made in the above invention and different embodiments of the invention could be made without departing from the scope thereof, it is intended that all matter contained in the above description or taken in connection with the accompanying drawing shall be interpreted as illustrated and not in a limiting sense.

I claim as my invention:

A ductile extruded brazing member in rod form having a thickness of from ¹⁄₃₂ inch to ¼ inch, the member composed of an alloy of from 6% to 9% by weight of silver, from 7% to 8% by weight of phosphorus and the balance being copper, the member having been extruded to shape while at a temperature of from 475° C. to 600° C. whereby the member is ductile.

References Cited in the file of this patent

UNITED STATES PATENTS

| | | |
|---|---|---|
| 1,651,709 | Jones | Dec. 6, 1927 |
| 1,829,903 | Leach | Nov. 3, 1931 |
| 2,040,797 | Sachs et al. | May 12, 1936 |
| 2,162,627 | McGregor | June 13, 1939 |
| 2,290,684 | Graham | July 21, 1942 |
| 2,330,062 | Lempert | Sept. 21, 1943 |

FOREIGN PATENTS

| | | |
|---|---|---|
| 538,297 | Great Britain | July 28, 1941 |